US006904023B2

(12) United States Patent
Albal et al.

(10) Patent No.: US 6,904,023 B2
(45) Date of Patent: Jun. 7, 2005

(54) METHOD AND APPARATUS FOR GROUP CALL SERVICES

(75) Inventors: Nandakishore A. Albal, Scottsdale, AZ (US); Peter J. Armbruster, Chandler, AZ (US); Thomas G. Hallin, Wheaton, IL (US); Derek A. Oxley, Chandler, AZ (US); William N. Shores, Phoenix, AZ (US); William R. Worger, Gilbert, AZ (US); George Xenakis, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 73 days.

(21) Appl. No.: 10/402,433

(22) Filed: Mar. 28, 2003

(65) Prior Publication Data

US 2004/0190496 A1 Sep. 30, 2004

(51) Int. Cl.[7] .......................... H04L 12/64; H04L 12/66
(52) U.S. Cl. ...................... 370/260; 370/270; 370/466
(58) Field of Search .................................. 370/259–263, 370/270, 271, 401, 347, 389, 465, 466, 467

(56) References Cited

U.S. PATENT DOCUMENTS

| | | | | |
|---|---|---|---|---|
| 6,640,109 B1 | * | 10/2003 | Drozt et al. | 455/508 |
| 6,694,134 B1 | * | 2/2004 | Lu et al. | 455/419 |
| 2003/0017836 A1 | * | 1/2003 | Vishwanathan et al. | 455/517 |
| 2003/0095510 A1 | * | 5/2003 | Dorenbsoch | |
| 2003/0148779 A1 | * | 8/2003 | Aravamudan et al. | 455/519 |
| 2003/0235184 A1 | * | 12/2003 | Dorenbosch et al. | |
| 2003/0236093 A1 | * | 12/2003 | Drozt et al. | |
| 2004/0008680 A1 | * | 1/2004 | Moss et al. | 370/390 |

* cited by examiner

*Primary Examiner*—Hassan Kizou
*Assistant Examiner*—Ahmed Elallam
(74) *Attorney, Agent, or Firm*—Frank J. Bogacz

(57) ABSTRACT

The voice signaling gateway (10) provides group call and call back services among iDEN network (20) users (21) and a number of other various networks (30–60) users (31–62). The voice signaling gateway has packet data interface (17) and web interface (16) In an alternate embodiment of the invention, an integrated applications server (70) is added to the voice signaling gateway (100) to provide group call services. The integrated applications server has the functions for supporting group calls which were within the voice signaling gateway (10) and forms a stand-alone special feature system.

36 Claims, 3 Drawing Sheets

METHOD AND APPARATUS FOR GROUP CALL SERVICES

BACKGROUND OF THE INVENTION

The present invention pertains to group call services and more particularly to group call services through a plurality of networks.

Today group call services are provided by specialized networks such as iDEN (integrated digital enhanced network). A group call is one in which the originator selects a person or persons to which he wishes to speak and the target user's phone immediately transmits the words of the originator, without the ringing and answering of typical phone calls. In an alternate embodiment, the group call can be presented to the target for acceptance by the target. Another group call service is referred to as Call-back. This service provides the ability of the target to rejoin or reestablish a group call that has/had been established.

The iDEN system is a "closed system" which offers group call services to those customers who are currently in the iDEN TDMA (time division multiple access) network. Other networks such as code-division multiple access (CDMA), global system mobile (GSM), internet protocol (IP) and 802.11 type networks do not support group call services at the present time. Non-iDEN subscribers may wish to make group calls to the existing customer base of iDEN subscribers and vice-versa or to mixed iDEN and non-iDEN groups.

The users of group call services are typically organized into talk groups. Talk groups usually contain users that share a common mission, such as a work group. Work groups may be put together such that not all the users are uniformly iDEN or non-iDEN. Current dispatch call service systems are unable to facilitate the connection of such diverse users.

Dispatch systems have been provided to alleviate this problem; however, such group call systems involve many limitations including missed calls, poor audio quality, and gaps in speech.

Accordingly, a need exists to provide for group call services for non-iDEN systems and among iDEN users and non-iDEN systems.

DESCRIPTION OF THE PREFERRED EMBODIMENT OF THE INVENTION

Group call services are becoming more widespread. Non-iDEN subscribers need to make group calls to the existing customer base of millions of iDEN subscribers and vice versa.

The present invention includes the introduction of a new network element called a voice signaling gateway (VSGW). The VSGW provides signaling and bearer path conversion of all traffic between an iDEN network and non-iDEN networks. The VSGW is network agnostic on the non-iDEN network end. The VSGW may be used with Code Division Multiple Access (CDMA), Global System Mobile (GSM), 802.11 (such as Wireless LANs) and traditional Internet Protocol (IP) for desktop group call services. The present invention does not require the iDEN network elements to be modified, nor does the present invention require that the iDEN users be aware that they are communicating with users on a non-iDEN network.

Figure 1:
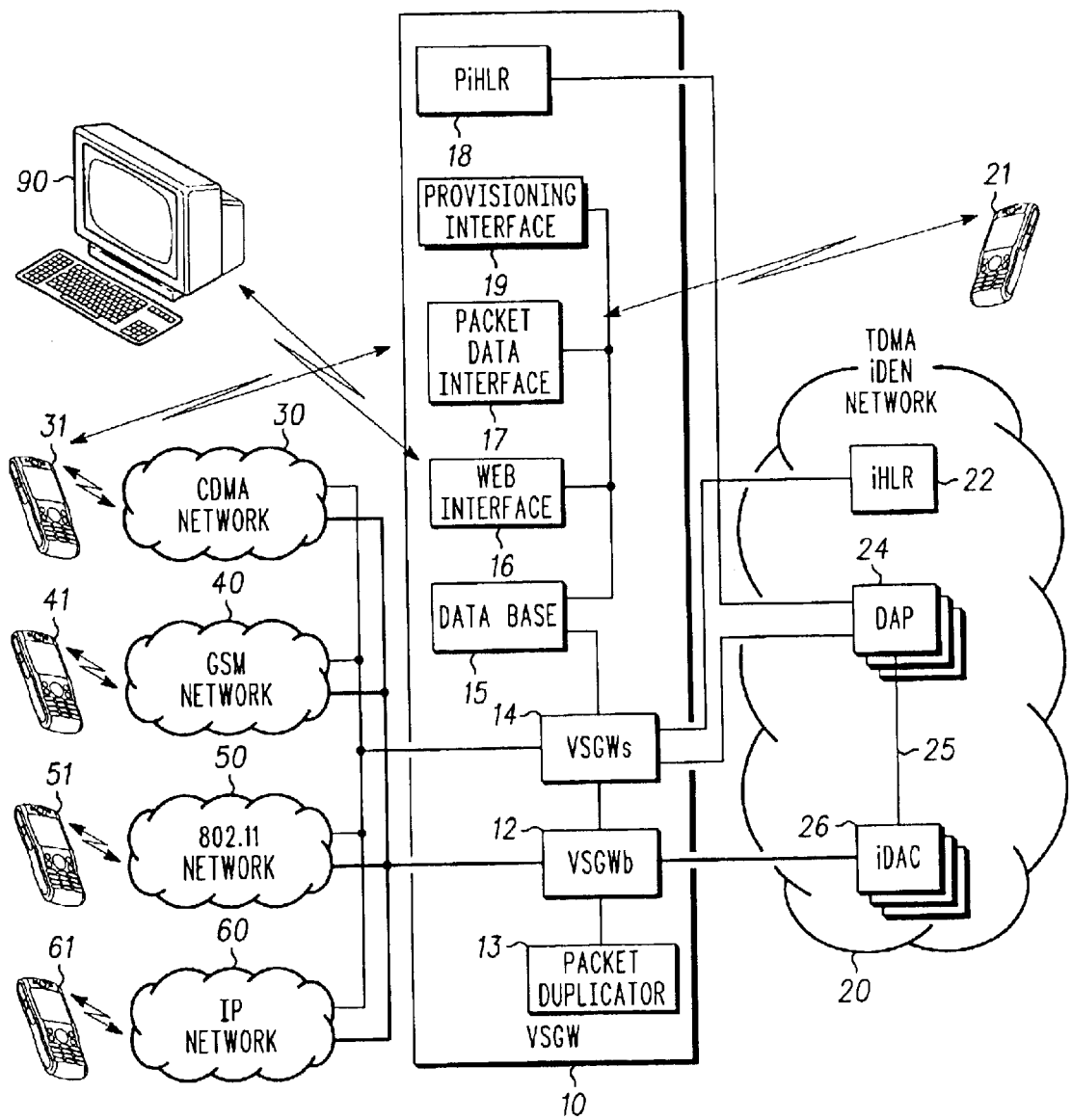
FIG. 1 is a block diagram of a system for facilitating group calls among iDEN networks and various non-iDEN networks via a gateway in accordance with the present invention.

Referring to FIG. 1, a block diagram of voice signaling gateway 10 interconnected between iDEN network 20 and a number of non-iDEN networks 30–60 is shown. The voice signaling gateway (VSGW) 10 provides group call and call back services to iDEN and non-iDEN subscribers. The VSGW 10 uses DAP-DAP signaling with the iDEN DAP, and SIP signaling with non-iDEN call engines to establish group calls and call back. SIP is defined by IETF RFC3261.

The VSGW 10 allocates bearer resources for SIP to DAP dispatch calls and vice-versa. DAP 24 is a dispatch application server that processes dispatch requests within the iDEN network 20. VSGW 10 looks like a DAP on the iDEN network 20 side and a SIP engine on the non-iDEN side. The iHLR 22 is the iDEN home location register. The iHLR is a database that includes subscriber records/profiles and rules that dictate how a dispatch call should be handled for iDEN subscribers. The iHLR is the place where iDEN subscriber 21, for example, is registered in the network which provides service to subscriber 21. The iHLR 22 stores the subscriber profile and records and the identity of the DAP 24 in which the subscriber is registered.

iDAC 26 is the iDEN dispatch audio controller. For the iDEN network 20, the iDAC 26 handles the voice payload in a proprietary format called iRTP. DAP 24 provides bearer traffic control to iDAC 26 via connection 25. VSGWb 12 of voice signaling gateway 10 behaves like iDAC 26. The voice payload on the non-iDEN networks adhere to the RTP standard and the protocol conversion between RTP and iRTP is performed by VSGWb 12. RTP is defined in IETF RFC1889.

Voice signaling gateway 10 includes voice signaling gateway bearer control 12 and voice signaling gateway signaling control 14. VSGWs 14 is coupled to iHLR 22 and to DAP 24. VSGWb 12 is coupled to iDAC 26.

VSGW 10 also includes a packet duplicator 13 which is coupled to VSGWb 12. The packet duplicator duplicates voice packets multi-directionally and optionally can exclude the speaker.

VSGW 10 also includes a packet data interface 17 which is coupled to data base 15. VSGW 10 further includes web interface 16 which is coupled to a data base 15. Note that the term web interface is intended to not only include interfaces that adhere to the HTTP, XML and WAP protocols but their derivates as well. The packet data interface is used by subscriber devices to access applications on the VSGW 10 and to define, update, modify, and delete group definitions. Web interface 16 provides another mechanism for end-users to access the aforementioned applications and define groups. Provisioning interface 19 enables carrier/operator personnel to define groups and store then in the database 15. VSGW 10 includes a database 15 which stores, the group definitions, membership, profile and characteristics. Database 15 is coupled to the provisioning interface 19, packet data interface 17, web interface 16 and is also coupled to VSGWs 14. Lastly, VSGW 10 includes a Pseudo iHLR (PiHLR) 18 that contains location information associated with the group call.

It should be obvious to those skilled in the art that the PiHLR could also contain subscriber profiles for non-iDEN subscribers and group specific profile. DAP 24 communicates with PiHLR 18 using the MAP protocol, in addition VSGWs 14 communicates with the iHLR 22 using the MAP protocol.

MAP is an abbreviation for mobile application part and is a standard based protocol which enables real time communication between nodes in a mobile cellular network. A typical use of the MAP signaling protocol is the transfer of location information from a visiting location register (VLR) which is within the DAP to the iDEN home location register (iHLR) 22. MAP includes a layer in the signaling system seven standards which is used by GSM networks and UMTS (Universal Mobile Telecommunications System). The standard is defined by ETSI TS129120V3.0.0.

Web interface 16 allows the CDMA (code division multiple access) network 30, GSM (global system mobile) network 40, 802.11 (such as Wireless LAN) network 50 and internet protocol (IP) network 60 to access data base 15.

VSGW 10 includes packet duplicator 13, group call engine VSGWs 14 and VSGWb 12 and in the preferred embodiment, talker arbitration capabilities are provided via packet duplicator 13. It should be obvious to those skilled in the art that Talker Arbitration capabilities could be included in the VSGWs 14, DAP 24, or other call control entities in the non-iDEN networks 30–60. Database 15 of VSGW 10 provides a data store for group definitions (i.e., which users are in a particular group) and interfaces (e.g., packet data and web interfaces) to enable each defined group to have members of iDEN network and/or non-iDEN networks as mentioned above. In addition database 15 may be provisioned to provide iHLR like services to users who access dispatch services via the IP network 60.

First, the VSGW 10 as shown in FIG. 1 provides for operator provisioned group calls. A network or system operator defines membership of a group call within the VSGW 10 via the operator console 90. The definition of the group is stored within the VSGW 10 in database 15. As a result of the group call definition in the VSGW 10, the group members may be subscribers in iDEN TDMA networks, non-iDEN TDMA networks or a combination of iDEN TDMA and non-iDEN TDMA network subscribers.

Any individual subscriber 21–62 may make a call to the VSGW 10 with the assigned group call identity. VSGW 10 receives the request and translates the group call identity into a member list using database 15. The VSGW then launches a call to each group member 21–62.

Assuming that the call was originated by subscriber 21, each group member 31–62 is presented with a call from the group call originator, subscriber 21. Some subscribers in the non-iDEN networks 30–60 may be informed that this is a group call with flexibility to provide session initiation protocol (SIP) signaling. When the first group call member subscriber 31, for example, joins the call, packet duplicator 13 bridges the call or transmits the data packet from originating group call member subscriber 21 to subscriber 31. In the preferred embodiment, during the duration of the group call, packet duplicator 13 performs talker arbitration function. That is, packet duplicator 13 determines which subscriber 21–62 is able to be the speaker at any individual time. In an alternate embodiment talker arbitration may not be needed if the networks support full-duplex voice communication.

If subscriber 62 joins the group call, for example, packet duplicator 13 transmits the packets also to subscriber 62 via IP network 60.

Second, for user provision group calls, subscriber 21, for example, accesses the VSGW 10 via the packet data interface 17. As a result, the user provision group call leads to defining a membership group similar to the operator provisioned group calls above and generates a group call identity. This group call identity is stored in the database 15 of VSGW 10. The originating subscriber 21, for example, then makes a call indicating the group call identity and the call proceeds as explained-above for the operator provisioned group call.

For the aforementioned operator-provisioned and user-provisioned group calls, the database maintains the group definitions for a variable period of time. Another type of group call that the subscriber can invoke is a Selective Dynamic Group Call (SDGC). In a SDGC, the user dynamically selects a set of group call participants (e.g. from an address book) and launches a call request to VSGW 10. In one embodiment, the life of this selective dynamic group definition is maintained for the life of the call. In another embodiment the group definition is maintained for a short duration after the initial call is terminated. In the former case the database 15 does not store the group definition, whereas in the latter case it is stored for the specified lifetime of the selective dynamic group to support the call back service.

Third, for a selective dynamic group call, subscriber 21 originates access to the VSGW 10 via the packet data interface 17 or a selective dynamic group call request directly to the VSGWs 12. Originating subscriber 21 then defines the membership of the group call dynamically with the VSGW 10. The definition may be dynamically stored within the database 15 of VSGW 10, or obtained directly from subscriber 21 by VSGWs 14. VSGWs 14 initiates a SDGC to each group call member based on the information provided directly by subscriber 21 or from data in database 15. The SDGC includes the group call identity, and the call flows are as indicated above for the operator provisioned group call.

Figure 2:
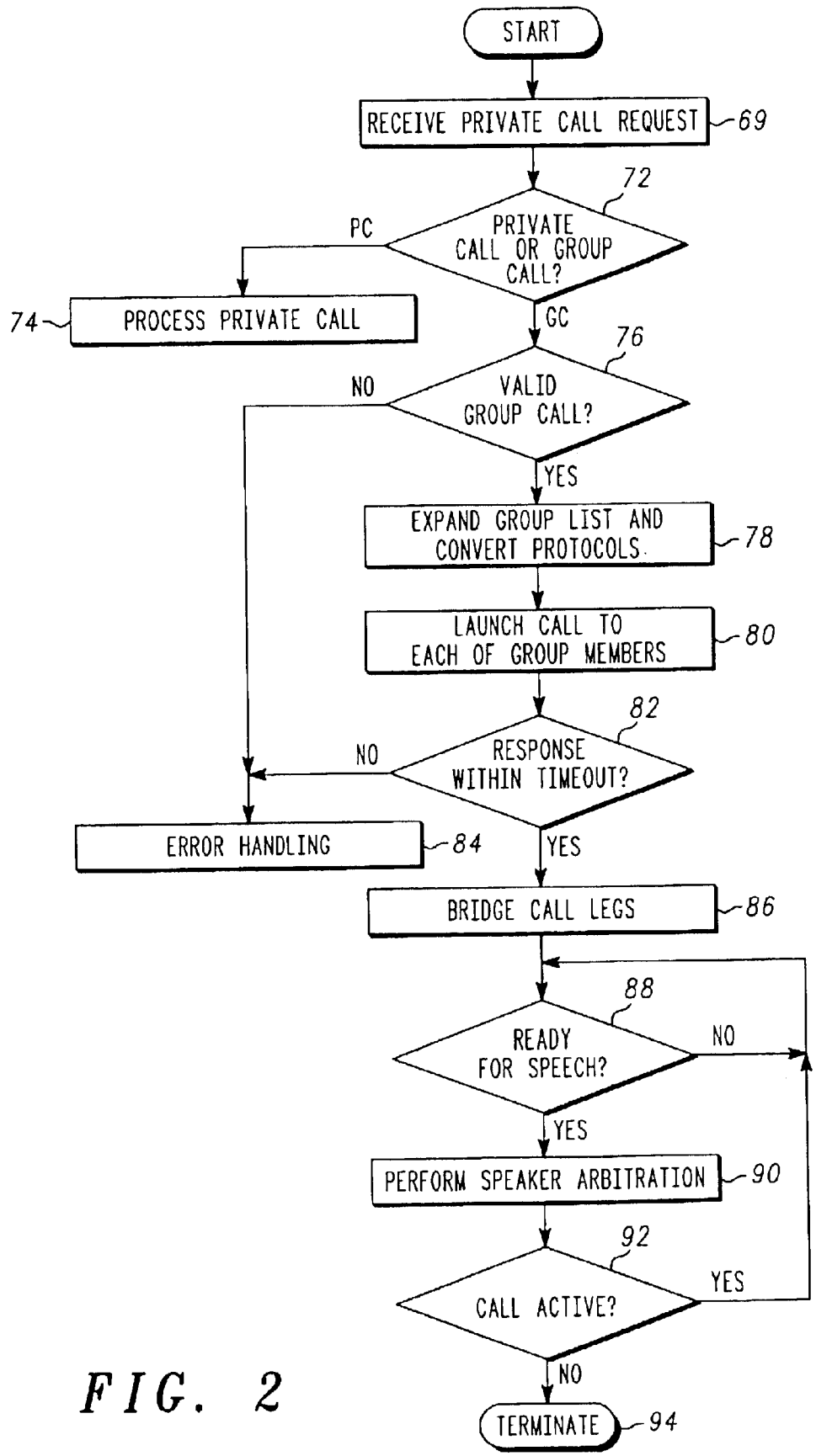
FIG. 2 is a flow chart of a method for group calls between iDEN and non-iDEN users in accordance with the present invention.

FIG. 2 is a flow chart of the call processing of the VSGW, 10. The start block is entered and control is transferred to block 69. Block 69 transfers control to block 72. Block 72 determines whether the request is for a call or a group call. If the request is for a call, block 72 transfers control to block 74. Block 74 processes the private call in a typical fashion.

If the request is for a group call, block 72 transfers control to block 76 via the GC path. Block 76 determines whether the group call is valid. For example, whether the group call identity is a valid one. If not, block 76 transfers control to block 84 via the no path. Block 84 provides for handling the error.

If the group call is valid, block 76 transfers control to block 78 via the Y path. Block 78 expands the group list for producing a group call from a single request.

Next, block 80 launches a private call to each of the group members indicated in the database. Then block 82 determines whether the response to each of the private calls is within a predetermined time out. If not, block 82 transfers control to block 84 for error handling.

If the response by each of the group call members was within the time out block 82 transfers control to block 86 where the individual legs of the group call are bridged by the packet duplicator 13. That is, it interconnects each of the subscribers 21–62.

Then block 88 determines whether the connected group call is ready for speech. If not, block 88 waits until the group call is ready for the speaker. If the group call is ready for speech, block 88 transfers control to block 90 via the Y path.

Block 90 has the packet duplicator perform talker arbitration. That is the packet duplicator 13 determines who the next speaker is and transmits that subscriber's speech to each of the group call subscribers. Then block 92 determines whether the group call is active. If it is, block 92 transfers control to block 88 via the, Y path to determine when a new speaker is ready for speech. The process of blocks 88, 90 and 92 is then iterated. If the group call does not ever go active, block 92 transfers control to block 94 via the no path. Block 94 terminates the call.

Figure 3:
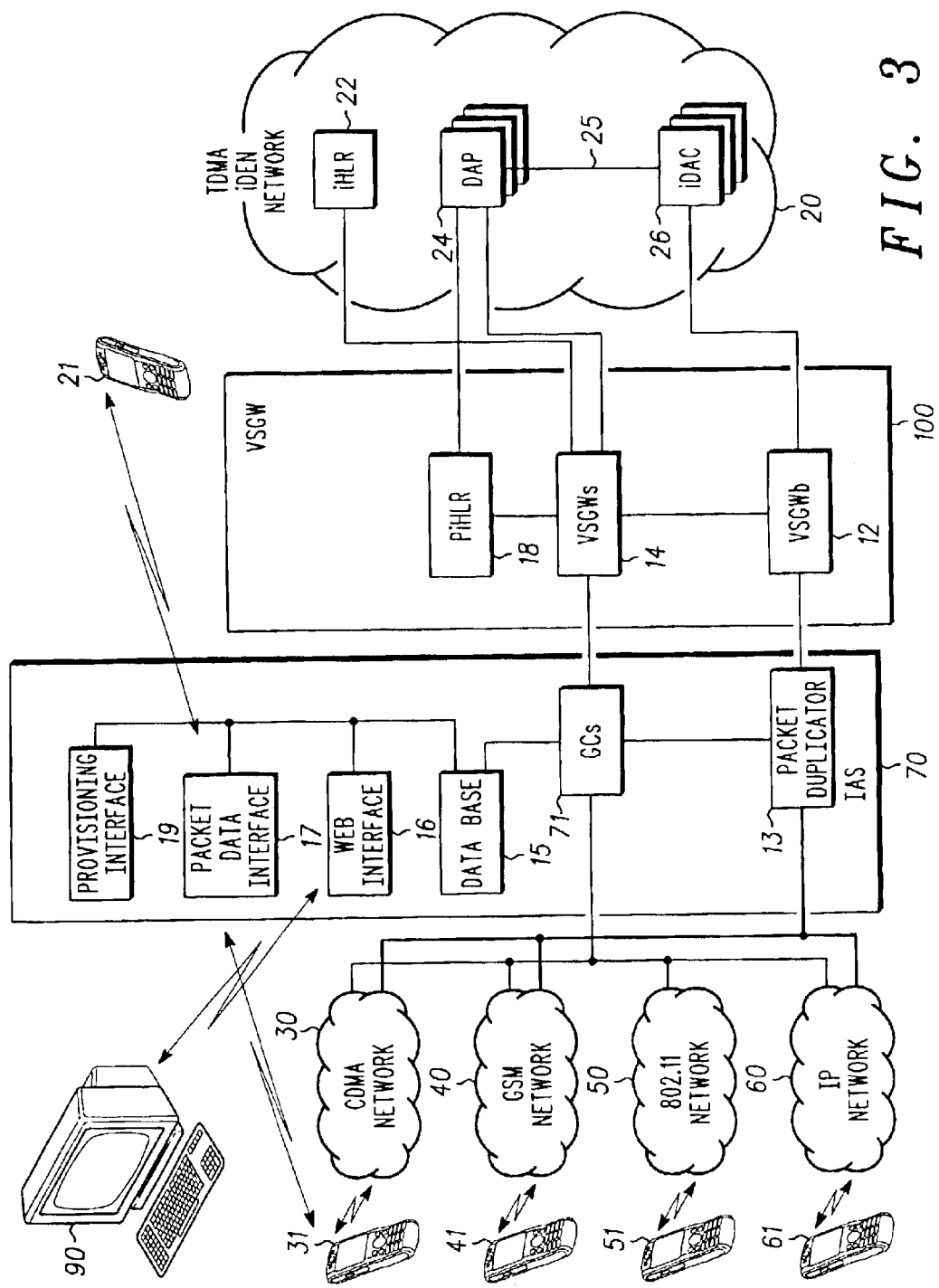
FIG. 3 is a block diagram of a system for facilitating group calls among iDEN networks and various non-iDEN networks via an integrated application server in accordance with the present invention.

Now turning to FIG. 3, an alternate embodiment of the present invention is depicted. In this embodiment of the invention VSGW 10 has been replaced by a modified VSGW 100 and an integrated application server 70. The integrated application server (IAS) 70 may functionally be located apart from the VSGW 100. The group call processing which was in VSGW 10 is now moved to IAS 70. IAS 70 now includes a group call signaling controller 71.

GCs 71 is coupled to packet duplicator 13. The packet data duplicators of FIGS. 1 and 3 are of equivalent period.

GCs 71 is coupled to database 15. The database 15 is coupled to the web interface 16, packet data interface 17 and the provisioning interface 19. Each of these functions 15, 16, 17 and 19 provide the same functions as described for blocks 15, 16, 17 and 19 in the VSGW 10 of FIG. 1. The arrangement of FIG. 3 gives the flexibility of providing a separate server, the IAS 70 to handle group calls, and having a VSGW 100 that provide an iDEN gateway function. IAS 70 processes group calls as explained in FIG. 2. The processing of IAS 70 for operator provisioned group calls, user provisioned group calls and selective dynamic group calls is identical to the processing explained in FIG. 2 for the VSGW 10. That is, for this embodiment of the invention the group call handling capability has been removed from VSGW 10 and put in a separate server, the IAS 70. VSGW 100 contains the VSGWs 14, VSGWb 12 and the PiHLR 18 functions as explained in FIG. 2.

In view of the foregoing, it can be appreciated that the present invention provides a group call and call back services which are network independent. Furthermore, the group call and call back features may serve subscribers of conventional iDEN TDMA networks as well as CDMA, GSM, 802.11 type and IP networks. This invention provides a standards compliant interface on the non-iDEN TDMA-interface and does not require changes to the iDEN TDMA networks. Further, existing iDEN TDMA type handsets do not require modification. Lastly, call groups may be established between iDEN TDMA and non-iDEN TDMA subscribers. This provides for interconnections of group calls for many, many subscribers.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. An apparatus for providing group call services among an iDEN network and a plurality of non-iDEN networks, the apparatus comprising:
a voice signaling gateway (VSGW) coupled to the plurality of non-iDEN networks and to the iDEN network;
an originating unit located in one of the plurality of non-iDEN networks or iDEN network and the originating unit coupled to the VSGW for initiating a group call to at least one target unit of a plurality of target units, in another of the plurality of non-iDEN networks or iDEN network; and
means for storing in the VSGW information for each of a plurality of the target units of the group call, the information including group related information for the plurality of non-iDEN networks and iDEN network.

2. The apparatus for providing group call services as claimed in claim 1, wherein the voice signaling gateway (VSGW) includes:
a VSGW signaling controller for generating signaling information for the iDEN network and the plurality of non-iDEN networks; and
a VSGW bearer traffic controller for converting bearer traffic between the iDEN network and the plurality of non-iDEN networks.

3. The apparatus for providing group call services as claimed in claim 2, wherein the VSGW signaling controller is coupled to the VSGW bearer traffic controller via a bearer control connection whereby the VSGW signaling controller controls bearer traffic through the VSGW bearer traffic controller among the iDEN network and the plurality of non-iDEN networks.

4. The apparatus for providing group call services as claimed in claim 2, wherein the VSGW further includes a packet duplicator coupled to the VSGW bearer traffic controller for duplicating bearer traffic packets sent by the originating unit to each of the plurality of target units and by each of the plurality of target units to the originating unit and to other of the plurality of target units.

5. The apparatus for providing group call services as claimed in claim 2, wherein the VSGW further includes a packet data interface coupled between the originating unit and the data base, the packet data interface for transferring group definition and group specific information into and out of the data base.

6. The apparatus for providing group call services as claimed in claim 2, wherein the VSGW further includes a web interface coupled between the originating unit and the data base, the web interface for transferring group definition and group specific information into and out of the data base.

7. The apparatus for providing group call services as claimed in claim 2, wherein the means for storing further includes a data base for storing an identity of each target unit of the plurality of target units for a plurality of group calls.

8. The arrangement for providing group call services as claimed in claim 2, wherein there is further included a mobile application part signaling connection between the VSGW signaling controller and home location register means, the mobile application part signaling connection providing location information.

9. The arrangement for providing group call services as claimed in claim 2, wherein there is further included a mobile application part signaling connection between a DAP and a Pseudo-iHLR means, the mobile application part signaling connection providing location information.

10. The apparatus for providing group call services as claimed in claim 7, wherein the VSGW further includes a provisioning interface coupled between an operator console and the data base, the provisioning interface for transferring group definition and group specific information into and out of the data base.

11. The apparatus for providing group call services as claimed in claim 1, wherein the plurality of non-iDEN networks includes at least one of:
code division multiple access (CDMA) network,
global system mobile (GSM) network;

internet protocol (IP) network; and 802.11 type network.

12. A method for a group call by a voice signaling gateway (VSGW) among an iDEN network and a plurality of non-iDEN networks, the method comprising the steps of:

determining that a request from an originating unit is for a group call with a plurality of target units of the iDEN network and the plurality of non-iDEN networks;

determining an identity and a network destination for each of the plurality of target units, the network destination being an iDEN network or a non-iDEN network;

converting bearer traffic of a first protocol of the originating unit to one of a plurality of protocols, the plurality of protocols corresponding to the iDEN network and the plurality of non-iDEN networks; and transmitting the converted bearer traffic from the originating unit to the plurality of target units.

13. The method for a group call as claimed in claim 12, wherein there is further included steps of:

converting signaling traffic of a first protocol of the originating unit to one of a plurality of protocols, the plurality of protocols corresponding to the iDEN network and the plurality of non-iDEN networks;

converting signaling traffic of the one of the plurality of protocols of one of the plurality of target units to another of the plurality of protocols or to the first protocol; and transmitting the converted signaling traffic from one of the plurality of target units to another of the plurality of the target units or to the originating unit.

14. The method for a group call as claimed in claim 12, wherein there is further included steps of:

converting bearer traffic of the one of the plurality of protocols of one of the plurality of target units to another of the plurality of protocols or to the first protocol; and transmitting the converted bearer traffic from one of the plurality of target units to another of the plurality of the target units or to the originating unit.

15. The method for a group call as claimed in claim 12, wherein there is further included a step of determining whether a response of each of the plurality of the target units is within a predetermined time.

16. The method for a group call as claimed in claim 15, wherein if the response of each of the plurality of target units is within the predetermined time, there is further included a step of coupling the originating unit and each of the plurality of target units for speech.

17. The method for a group call as claimed in claim 16, wherein there is further included steps of:

determining whether the originating unit or one of the plurality of target units is ready for speech; and waiting until one of the plurality of target units or the originating unit is ready for speech.

18. The method for a group call as claimed in claim 17, wherein there is further included a step of arbitrating for a speaker among one of the plurality of target units and the originating unit.

19. The method for a group call as claimed in claim 18, wherein there is further included steps of:

determining whether the group call is active;

if the group call is active, iterating the steps of:

determining whether the originating unit or one of the plurality of target units is ready for speech;

waiting until one of the plurality of target units or the originating unit is ready for speech; and arbitrating for a speaker among one of the plurality of target units and the originating unit.

20. An apparatus for providing group call services among an iDEN network and a plurality of non-iDEN networks, the apparatus comprising:

a voice signaling gateway (VSGW) coupled to the iDEN network;

integrated application server (IAS) means coupled to the plurality of non-iDEN networks and to the VSGW;

an originating unit located in one of the plurality of non-iDEN networks or iDEN network and the originating unit coupled to the IAS means for initiating a group call to at least one target unit of a plurality of target units, in another of the plurality of non-iDEN networks or iDEN network; and means for storing in the IAS means information for each of a plurality of the target units of the group call, the information including group related information for the plurality of non-iDEN networks and iDEN network.

21. The apparatus for providing group call services as claimed in claim 20, wherein the integrated application server (IAS) means includes a group call signaling controller for generating signaling information for the iDEN network and the plurality of non-iDEN networks.

22. The apparatus for providing group call services as claimed in claim 21, wherein the IAS means further includes a packet duplicator coupled to the group call controller GCs for duplicating bearer traffic packets sent by the originating unit to each of the plurality of target units and by each of the plurality of target units to the originating unit and to other of the plurality of target units.

23. The apparatus for providing group call services as claimed in claim 21, wherein the IAS means further includes a packet data interface coupled between the originating unit and the data base, the packet data interface for transferring group definition and group specific information into and out of the data base.

24. The apparatus for providing group call services as claimed in claim 21, wherein the IAS means further includes a web interface coupled between the originating unit and the data base, the web interface for transferring group definition and group specific information into and out of the data base.

25. The apparatus for providing group call services as claimed in claim 20, wherein the means for storing further includes a data base for storing an identity of each target unit of the plurality of target units for a plurality of group calls.

26. The apparatus for providing group call services as claimed in claim 19, wherein the plurality of non-iDEN networks includes at least one of:

code division multiple access (CDMA) network;

global system mobile (GSM) network;

internet protocol (IP) network; and 802.11 type network.

27. The apparatus for providing group call services as claimed in claim 20, wherein there is further included a mobile application part signaling connection between a DAP and a Pseudo-iHLR means, the mobile application part signaling connection providing location information.

28. The apparatus for providing group call services as claimed in claim 25, wherein the IAS means further includes a provisioning interface coupled between an operator console and the data base, the provisioning interface for transferring group definition and group specific information into and out of the data base.

29. A method for a group call by an integrated application server (IRS) via a voice signaling gateway (VSGW) among an iDEN network and a plurality of non-iDEN networks, the method comprising the steps of:

determining that a request from an originating unit is for a group call with a plurality of target units of the iDEN network and the plurality of non-iDEN networks;

determining en identity and a network destination for each of the plurality of target units, the network destination being an iDEN network or a non-iDEN network;

converting bearer traffic of a first protocol of the originating unit to one of a plurality of protocols, the plurality of protocols corresponding to the iDEN network and the plurality of non-iDEN networks; and transmitting the converted bearer traffic from the originating unit to the plurality of target units.

30. The method for a group call as claimed in claim 29, wherein there is further included steps of:

converting signaling traffic of a first protocol of the originating unit to one of a plurality of protocols, the plurality of protocols corresponding to the iDEN network and the plurality of non-iDEN networks;

converting signaling traffic of the one of the plurality of protocols of one of the plurality of target units to another of the plurality of protocols or to the first protocol; and transmitting the converted signaling traffic from one of the plurality of target units to another of the plurality of the target units or to the originating unit.

31. The method for a group call as claimed in claim 29, wherein there is further included steps of:

converting bearer traffic of the one of the plurality of protocols of one of the plurality of target units to another of the plurality of protocols or to the first protocol; and transmitting the converted bearer traffic from one of the plurality of target units to another of the plurality of the target units or to the originating unit.

32. The method for a group call as claimed in claim 29, wherein there is further included a step of determining whether a response of each of the plurality of the target units is within a predetermined time.

33. The method for a group call as claimed in claim 32, wherein if the response of each of the plurality of target units is within the predetermined time, there is further included a step of coupling the originating unit and each of the plurality of target units for speech.

34. The method for a group call, as claimed in claim 33, wherein there is further included steps of:

determining whether the originating unit or one of the plurality of target units is ready for speech; and waiting until one of the plurality of target units or the originating unit is ready for speech.

35. The method for a group call as claimed in claim 34, wherein there is further included a step of arbitrating for a speaker among one of the plurality of target units and the originating unit.

36. The method for a group call as claimed in claim 35, wherein there is further included steps of:

determining whether the group call is active;

if the group call is active, iterating the steps of:

determining whether the originating unit or one of the plurality of target units is ready for speech;

waiting until one of the plurality of target units or the originating unit is ready for speech; and arbitrating for a speaker among one of the plurality of target units and the originating unit.

\* \* \* \* \*

UNITED STATES PATENT AND TRADEMARK OFFICE
CERTIFICATE OF CORRECTION

PATENT NO. : 6,904,023 B2
DATED : June 7, 2005
INVENTOR(S) : Nandakishore A. Albal et al.

It is certified that error appears in the above-identified patent and that said Letters Patent is hereby corrected as shown below:

Column 6,
Line 58, insert -- means -- after "VSGW".

Signed and Sealed this

Twenty-seventh Day of December, 2005

JON W. DUDAS
*Director of the United States Patent and Trademark Office*